Nov. 17, 1925.
A. B. BEITMAN
1,561,682
VEHICLE SPRING AND SHACKLE CASING
Filed March 4, 1922
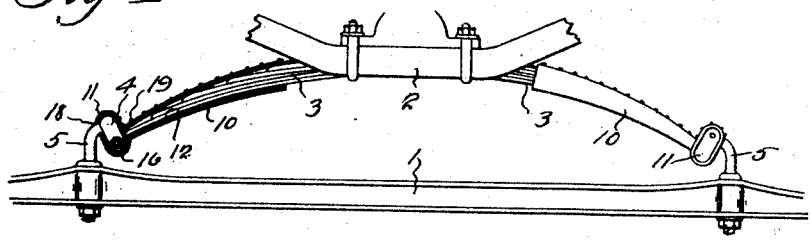
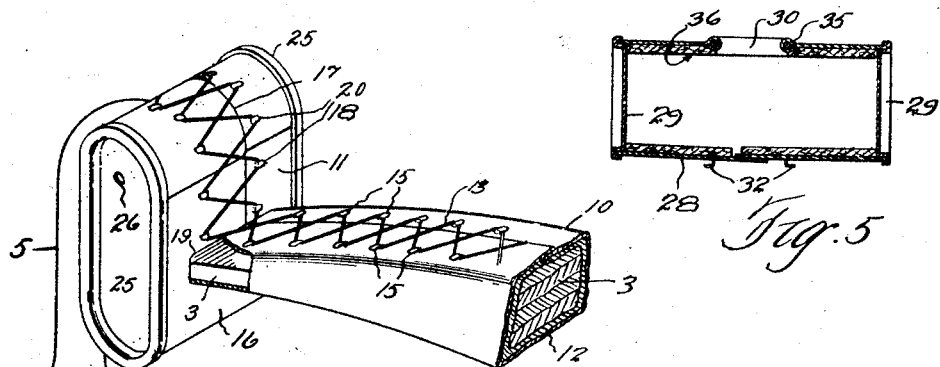
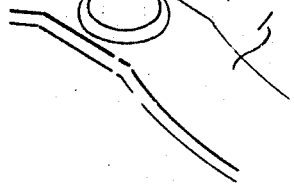
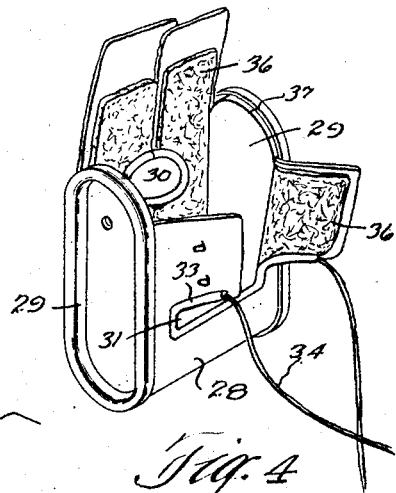
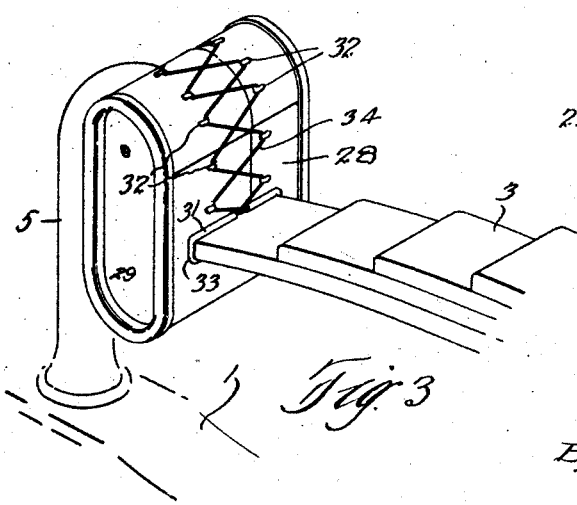
Inventor
Albert B. Beitman,
By Hull, Brock & West
Attys.

Patented Nov. 17, 1925.

1,561,682

UNITED STATES PATENT OFFICE.

ALBERT B. BEITMAN, OF CLEVELAND HEIGHTS, OHIO, ASSIGNOR TO THE ALBE MANUFACTURING COMPANY, OF CLEVELAND, OHIO, A CORPORATION OF OHIO.

VEHICLE SPRING AND SHACKLE CASING.

Application filed March 4, 1922. Serial No. 541,007.

*To all whom it may concern:*

Be it known that I, ALBERT B. BEITMAN, a citizen of the United States, residing at Cleveland Heights, in the county of Cuyahoga and State of Ohio, have invented a certain new and useful Improvement in Vehicle Spring and Shackle Casings, of which the following is a full, clear, and exact description, reference being had to the accompanying drawings.

This invention relates to casings for vehicle springs and spring shackles and it comprehends an embodiment combining with a cover for a vehicle spring, a shackle casing which constitutes an integral part of the cover to the end that the enclosed parts are protected against dirt, grit and the elements and kept oiled by a suitable lubricant contained within the casing.

The objects of the invention are to provide a cover for a vehicle spring which has a part for enclosing the spring shackle; to provide a combined spring and shackle casing which is simple of construction, economical of production, convenient of attachment, which interferes in no way with the action of the spring and shackle, which may be of pliable material and conform to the contour of the parts, rendering it neat and attractive of appearance, and to provide such a casing with means for administering a suitable lubricant to the parts enclosed thereby.

A further object is to provide a simple and inexpensive shackle casing, which may or may not be combined with a spring cover, constructed in part of flexible material which will conform to the shackle and adjust itself readily to the movements thereof and which includes metallic end plates which give shape and stability to the casing.

To the attainment of the foregoing objects, and others which will appear as this description proceeds, my invention may be defined as consisting of the combination and arrangement of parts illustrated in the drawing accompanying and forming a part hereof and wherein Fig. 1 is a fragmentary elevation of a vehicle showing my improved covers applied to the springs and shackles; Fig. 2 is an enlarged perspective view of one of the casings in the region of the shackle, parts of the automobile being included; Figs. 3 and 4 are similar views of a shackle casing constructed in accordance with my invention, the former view showing the casing applied, while the latter illustrates it removed and open; and Fig. 5 is a horizontal section through the shackle casing.

Fig. 1 illustrates in partial front elevation a well known make of automobile, and from the axle 1 thereof the frame 2 is supported through the springs 3, shackles 4 and spring hangers 5.

Covers 10, which are preferably made of a suitable flexible material and designed to conform to the shape of the spring, enclose the spring leaves from a point adjacent the frame 2 to their extreme outer ends where said covers join parts 11 that envelope the shackles 4. The parts 10 and 11 are preferably lined in part or in full with suitable absorbent material designated 12 which may be saturated with a suitable lubricant for keeping the spring leaves and shackle bolts well oiled at all times, the casing parts fitting in such manner as to effectually exclude dust and dirt and to protect the parts against the injurious effects of the elements.

The part of the casing which encloses the vehicle spring may be formed as a sheath that is adapted to be wrapped about the spring and have its edge portions overlapped and secured together by a suitable lacing 13 engaged over hooks 15 wherewith said edge portions are provided. The shackle enclosing part of the casing is shown as constructed in part of a strip or band of flexible material, such as that whereof the spring cover is made, the strip constituting a peripheral wall designated 16. This wall is slit, as at 17, from an opening 18, through which the spring hanger 5 extends, to an opening 19, through which the spring 3 enters the shackle casing, the spring cover 10 joining the shackle casing about the latter opening. Along each side of the slit 17 are arranged hooks 20 over which the aforementioned lacing 13 is engaged to hold the casing closed. A tubing or heading may be formed about the opening 18 and through it may be extended the lacing 13 in the same manner that the lacing 34 is extended through the heading 33 in the form of the invention illustrated in Figs. 3 to 5 and presently to be described.

The shackle enclosing portion of the casing is shown as formed with metallic end walls 25 which are turned over and crimped about their edges in locking engagement with the edges of the peripheral wall 16. These metallic end walls give shape and stability to the casing, and one or both of them may be provided with a hole 26 through which a lubricating oil may be introduced into the casing and which will find its way to all of the enclosed parts especially by virtue of the carrying quality of the absorbent material 12.

In Figs. 3, 4, and 5 I have illustrated a modification of the invention restricted to the spring shackle casing alone. Here a wall 28 of pliable material is supported between metallic end walls 29, the wall 28 being attached to the end walls down one side across the bottom and up the other side, while the top portion of the wall 28 is free from the end walls so that it may be thrown back as shown in Fig. 4. The wall 28 has an opening 30 on one side for the admission of the end of the spring hanger, and an opening 31 on the other to accommodate the end of the vehicle spring, and the end portions of the wall beyond the openings 30 and 31 are slitted, and along each side of the slit the wall is provided with hooks 32. A tubing or heading 33 extends about the opening 31 and a suitable lacing 34 is passed therethrough, so that when the casing is applied to a shackle and the parts folded over to enclose the same, as shown in Fig. 3, the lacing 34 may be engaged over the hooks 32 to draw the casing into shape about the shackle. A heading may be formed also around the opening 30 and a resilient wire 35 enclosed therein to cause the opening to hug the spring hanger. The wall 28 of the casing is preferably lined with a suitable absorbent material, as indicated at 36. When the casing is closed, the side edges of the upper end of the wall 28 rest upon ledges 37 that are produced by the depressed central portions of the end walls.

Having thus described my invention, what I claim is:

1. A combined spring and shackle casing comprising a cover of pliable material for the spring, said cover throughout its length fitting snugly about the spring and conforming in shape therewith, and a second cover similarly fitting the shackle and having an opening through which the end of the spring extends, said opening being a little larger than the cross sectional area of the part of the spring which extends through it, the covers being secured together about said opening and capable of yielding with respect to each other substantially according to the relative movements of the spring and shackle.

2. A casing for a vehicle spring and shackle comprising a part enclosing and conforming to the shape of the spring and a part enclosing and conforming to the shape of the shackle, the casing being made of flexible material and said parts having intercommunicating slits, and means for holding the slits closed, said parts being capable of yielding with respect to each other substantially according to the relative movements of the spring and shackle.

3. A casing for a vehicle spring and shackle comprising a part for enclosing the spring and a part for enclosing the shackle, the spring enclosing part being constructed of flexible material and the shackle enclosing part having a peripheral wall of flexible material that is joined to the former part, and metallic end walls attached to the ends of the peripheral wall.

4. A casing for a vehicle spring and shackle comprising a part for enclosing the spring and a part for enclosing the shackle, the shackle enclosing part having an opening for the admission of the end of the vehicle spring and a second opening for the admission of the spring hanger, the said part being slit between said openings, and the spring enclosing part having a slit joining that of the shackle enclosing part, and means for maintaining the slits closed.

5. A spring shackle casing comprising a flexible cover designed to enclose and fit snugly about the shackle, the same having openings for the admission of the spring end and the spring hanger, the casing being slit between said openings, and means for holding the slit closed.

6. A spring shackle casing comprising a flexible cover having openings for the admission of the spring end and of the spring hanger, the cover being slit between said openings, a heading surrounding each of said openings, a resilient element enclosed within one of said headings causing the opening to hug the part admitted therethrough, a lacing engaged through the heading of the other opening, and elements disposed along each side of the slit over which the lacing may be engaged for holding the slit closed.

7. A spring shackle casing comprising a peripheral wall, and end walls applied thereto, the peripheral wall having openings for the admission of the spring end and of the spring hanger and being slit circumferentially between said openings, and means for maintaining the slits closed.

8. A spring shackle casing comprising a peripheral wall, and end walls applied thereto, the peripheral wall having openings for the admission of the spring end and of the spring hanger and being slit circumferentially and transversely between said openings, and means for maintaining the slits closed.

9. A spring shackle casing comprising a peripheral wall of pliable material having openings for the admission of the spring end and of the spring hanger, and metallic end walls applied to the peripheral wall.

10. A spring shackle casing comprising a peripheral wall of pliable material having openings for the admission of the spring end and the spring hanger, and metallic end walls applied thereto, one or both of said metallic end walls having a lubricant opening.

11. A spring shackle cover comprising a peripheral wall of pliable material having openings for the admission of the spring end and spring hanger and being slit between said openings, means for maintaining the slit closed, and metallic end walls having their edges crimped about the lateral edges of the peripheral wall for holding the parts together.

12. A spring shackle casing comprising a peripheral wall having openings for the admission of the spring end and spring hanger, and end walls to which the peripheral wall is attached down one side, across the bottom and up the other side, the remaining portion of the peripheral wall being free from the end walls to constitute a flap for closing the top of the casing.

13. A spring shackle casing comprising a peripheral wall of flexible material and metallic end walls having outwardly extending peripheral flanges, the edge portions whereof are crimped about the lateral edges of the peripheral wall, down one side, across the bottom and up the other side, the remaining portion of the peripheral wall constituting a flap for closing the top of the casing and arranged to bear at its edges upon the adjacent portions of the peripheral flanges of the end walls, the peripheral wall having openings for the admission of the spring end and shackle support.

In testimony whereof, I hereunto affix my signature.

ALBERT B. BEITMAN.